US010212109B2

(12) United States Patent
Zou

(10) Patent No.: US 10,212,109 B2
(45) Date of Patent: *Feb. 19, 2019

(54) MESSAGE SENDING AND FORWARDING METHOD, APPARATUS, AND SYSTEM

(71) Applicant: Tencent Technology (Shenzhen) Company Limited, Shenzhen (CN)

(72) Inventor: Jianbo Zou, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,484

(22) Filed: Aug. 16, 2017

(65) Prior Publication Data
US 2017/0346771 A1 Nov. 30, 2017

Related U.S. Application Data

(63) Continuation of application No. 15/184,780, filed on Jun. 16, 2016, now Pat. No. 9,774,550, which is a (Continued)

(30) Foreign Application Priority Data

Dec. 25, 2013 (CN) .......................... 2013 1 0728597

(51) Int. Cl.
H04L 12/58 (2006.01)
H04L 29/06 (2006.01)
(Continued)

(52) U.S. Cl.
CPC .......... H04L 51/063 (2013.01); G06Q 50/01 (2013.01); H04L 51/14 (2013.01); H04L 51/32 (2013.01);
(Continued)

(58) Field of Classification Search
CPC ......... H04L 51/06; H04L 51/14; H04L 67/30; H04L 67/42; G06Q 50/01
(Continued)

(56) References Cited

U.S. PATENT DOCUMENTS

2009/0198761 A1 8/2009 Nanda et al.

FOREIGN PATENT DOCUMENTS

CN 101014024 A 8/2007
CN 101184199 A 5/2008
(Continued)

OTHER PUBLICATIONS

Tencent Technology, ISRWO, PCT/CN2014/093318, Mar. 25, 2015, 7 pgs.
(Continued)

Primary Examiner — Glenford J Madamba
(74) Attorney, Agent, or Firm — Morgan, Lewis & Bockius LLP

(57) ABSTRACT

Method and device of processing messages on a social network are disclosed. The method includes: receiving a parameter message from a first social network account, the parameter message specifying information that identifies a first message template, a respective value of a first parameter of the first message template, and a second social network account; determining whether the parameter message meets predefined criteria of the identified first message template including a predefined criterion on a social network relationship between the first social network account and the second social network account; in accordance with a determination that the parameter message meets the predefined criteria, composing a template message in accordance with the first message template and the respective value of the first parameter; and sending the composed template message
(Continued)

to the second social network account as a message originated from the first social network account.

18 Claims, 10 Drawing Sheets

Related U.S. Application Data continuation of application No. PCT/CN2014/093318, filed on Dec. 9, 2014.

(51) Int. Cl.
*H04L 29/08* (2006.01)
*G06Q 50/00* (2012.01)

(52) U.S. Cl.
CPC ............ *H04L 67/30* (2013.01); *H04L 67/306* (2013.01); *H04L 67/42* (2013.01)

(58) Field of Classification Search
USPC .......................................................... 709/206
See application file for complete search history.

(56) References Cited

FOREIGN PATENT DOCUMENTS

| | | | | | |
|---|---|---|---|---|---|
| CN | 101534346 | A | | 9/2009 | |
| CN | 101778160 | A | * | 7/2010 | ........ H04M 1/72552 |
| CN | 102763131 | A | * | 10/2012 | ............. G06Q 30/02 |
| CN | 103458043 | A | | 12/2013 | |
| CN | 104009966 | A | * | 8/2014 | |
| WO | WO 2008141212 | A2 | | 11/2008 | |

OTHER PUBLICATIONS

Tencent Technology, IPRP, PCT/CN2014/093318, Jun. 28, 2016, 5 pgs.

* cited by examiner

MESSAGE SENDING AND FORWARDING METHOD, APPARATUS, AND SYSTEM

PRIORITY CLAIM AND RELATED APPLICATIONS

This application is a continuation application of U.S. patent application Ser. No. 15/184,780, filed Jun. 16, 2016, entitled "MESSAGE SENDING AND FORWARDING METHOD, APPARATUS, AND SYSTEM", which is a continuation application of PCT Patent Application No. PCT/CN2014/093318, entitled "MESSAGE SENDING AND FORWARDING METHOD, APPARATUS, AND SYSTEM" filed on Dec. 9, 2014, which claims priority to Chinese Patent Application No. 201310728597.7, entitled "MESSAGE SENDING AND FORWARDING METHOD, APPARATUS, AND SYSTEM" filed on Dec. 25, 2013. All of the above applications are incorporated by reference in their entireties.

FIELD OF THE TECHNOLOGY

The present technology relates to the field of communications, and in particular, to a message sending and forwarding method, apparatus, and system.

BACKGROUND OF THE TECHNOLOGY

A public account is a communications account possessed by an organization, an enterprise or a public figure in the social communications application. Typically, a public account has transparent profile, welcomes and actively seeks followers and provides services on a regular basis. For example, Bank A may provide a public account in a social network. The public account may provide services, such as private bank querying, bill notification and monetary transaction for the customers of Bank A. Customers of Bank A may have ordinary accounts that follow the public account of the bank or send messages to the public account to request certain service.

The provider of social network has an interest in managing public accounts so that they do not send unsolicited, unlimited and/or unwanted messages to ordinary accounts. In addition, many messages from or to public accounts are routine, repetitive and in huge quantity. Composing these messages takes huge amount of time of the account users.

Therefore, it is desirable to have a method of managing these messages so that the manager of the social network can better monitor these messages and the users minimize their efforts in composing messages.

SUMMARY

In accordance with some implementations of the disclosed technology, a method of processing messages on a social network comprises: a server receiving a parameter message from a first social network account, the parameter message specifying a template identifier for a first message template, and a respective value of at least one parameter of the first message template; in accordance with the template identifier specified in the parameter message; identifying the first message template from a plurality of stored message templates; in accordance with the identified first message template and the value of the at least one parameter, composing a template message; and sending the composed template message to at least a second social network account as a message originated from the first social network account.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

To illustrate the technical solutions in the embodiments of the present technology more clearly, the following briefly introduces the accompanying drawings required for describing the embodiments of the present technology.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein.

Figure 1:
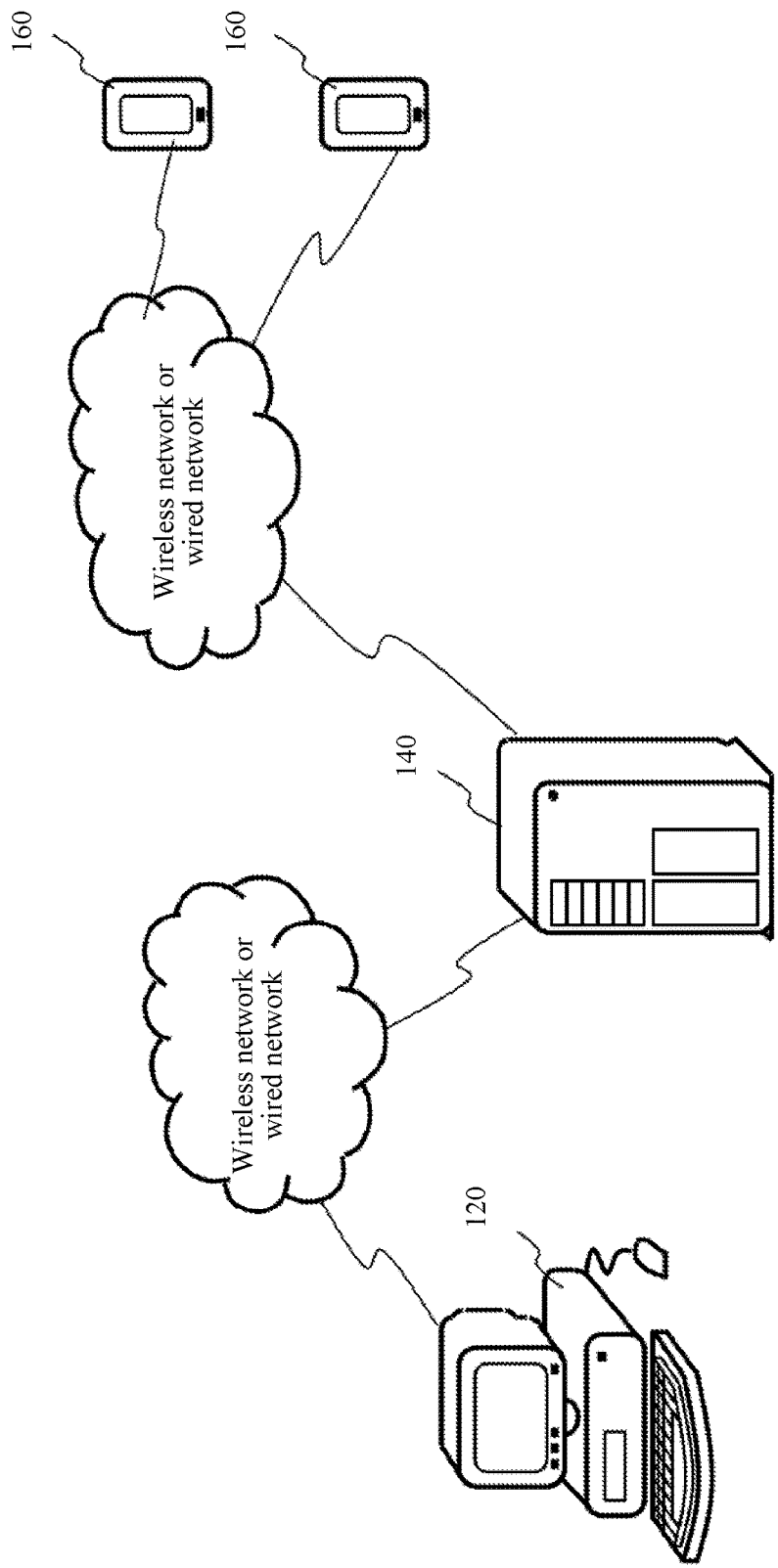
FIG. 1 is a schematic structural diagram of an implementation environment involved in accordance with some embodiments.

In accordance with some embodiments, FIG. 1 is a schematic structural diagram of an implementation environment. The implementation environment includes a public account client device 120, a server 140 and a client device 160 of an ordinary account.

In accordance with some embodiments, the public account client device 120 is a client device used by a user of a public account. The public account client device 120 is connected to the server 140 through a wireless network or wired network.

In accordance with some embodiments, the server 140 may be a server or a server cluster formed by several servers or a cloud computing service center. The server 140 provides the social communications application and/or supports a social network platform. The server 140 is connected to the public account client device 120 and the client device 160 of an ordinary account through a wireless network or wired network.

In accordance with some embodiments, the client device 160 of an ordinary account is a client device used by a holder of an ordinary account. Accounts may follow other accounts, and usually a public account has many follower accounts to which the public account provides service.

Figure 2:
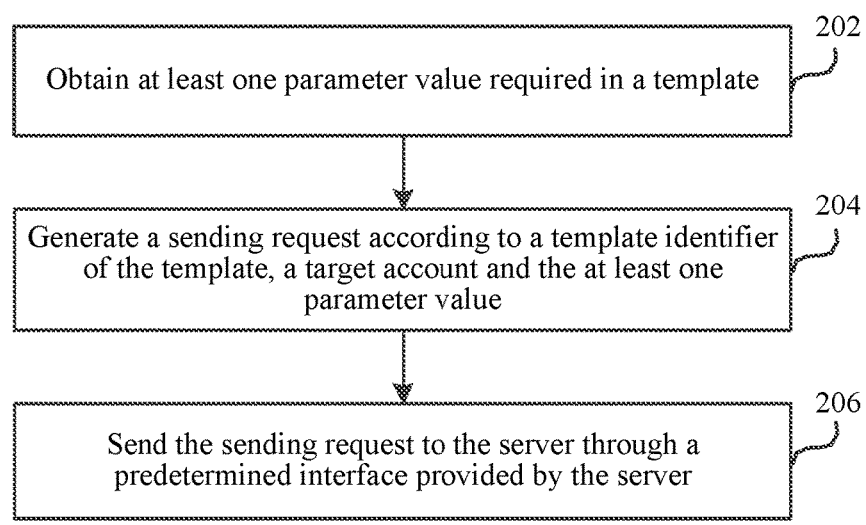
FIG. 2 is a flowchart of a method of message sending method in accordance with some embodiments.

In accordance with some embodiments, FIG. 2 is a flowchart of a method of a message sending method. The message is applied to the public account client device 120 exemplified in FIG. 1. The method includes the following steps.

In accordance with some embodiments, in Step 202, a public account client device obtains at least one parameter value required in a template.

The template is a template used for sending a template message. At least one parameter value is required in each template, and the parameter value is determined in real time when the template message is sent.

In accordance with some embodiments, in Step 204, the public account client device generates a sending request according to a template identifier, a receiving account and the at least one parameter value.

In accordance with some embodiments, in Step 206, the public account client device sends the sending request to the server through a predetermined interface provided by the server. In some embodiments, the sending request is sent as a message, e.g., a parameter message illustrated in FIG. 4C and accompanying text.

After receiving the sending request, the server fills the at least one parameter value in the template to generate the template message and sends the template message to the client device corresponding to the receiving account.

Figure 3:
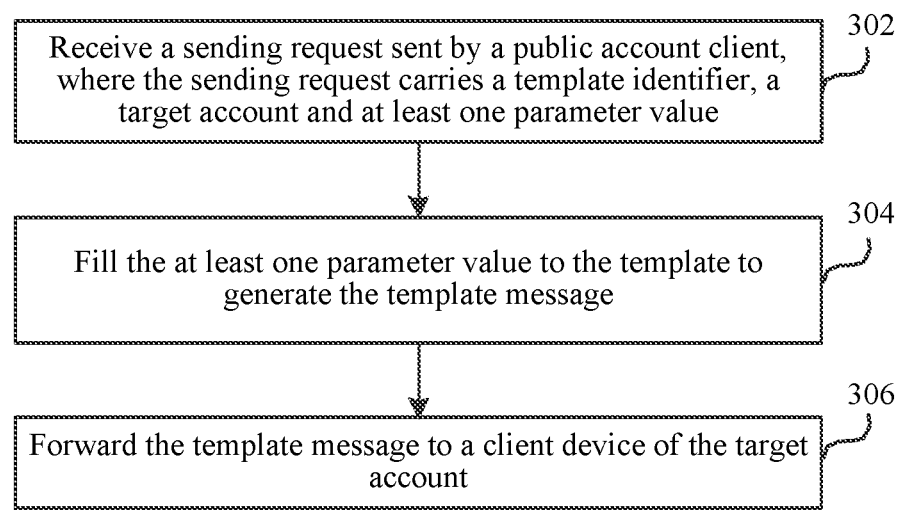
FIG. 3 is a flowchart of a message forwarding method in accordance with some embodiments.

FIG. 3 is a flowchart of a message forwarding method in accordance with some embodiments. The method is applied to the server 140 exemplified in FIG. 1. The method includes the following steps.

In accordance with some embodiments, in Step 302, the server receives a sending request sent by a public account client, wherein the sending request carries a template identifier, a receiving account and at least one parameter value.

In accordance with some embodiments, in Step 304, the server fills the at least one parameter value in the template corresponding to the template identifier to generate the template message.

In accordance with some embodiments, in Step 306, the server sends the template message to a client corresponding to the receiving account.

Figure 4A:
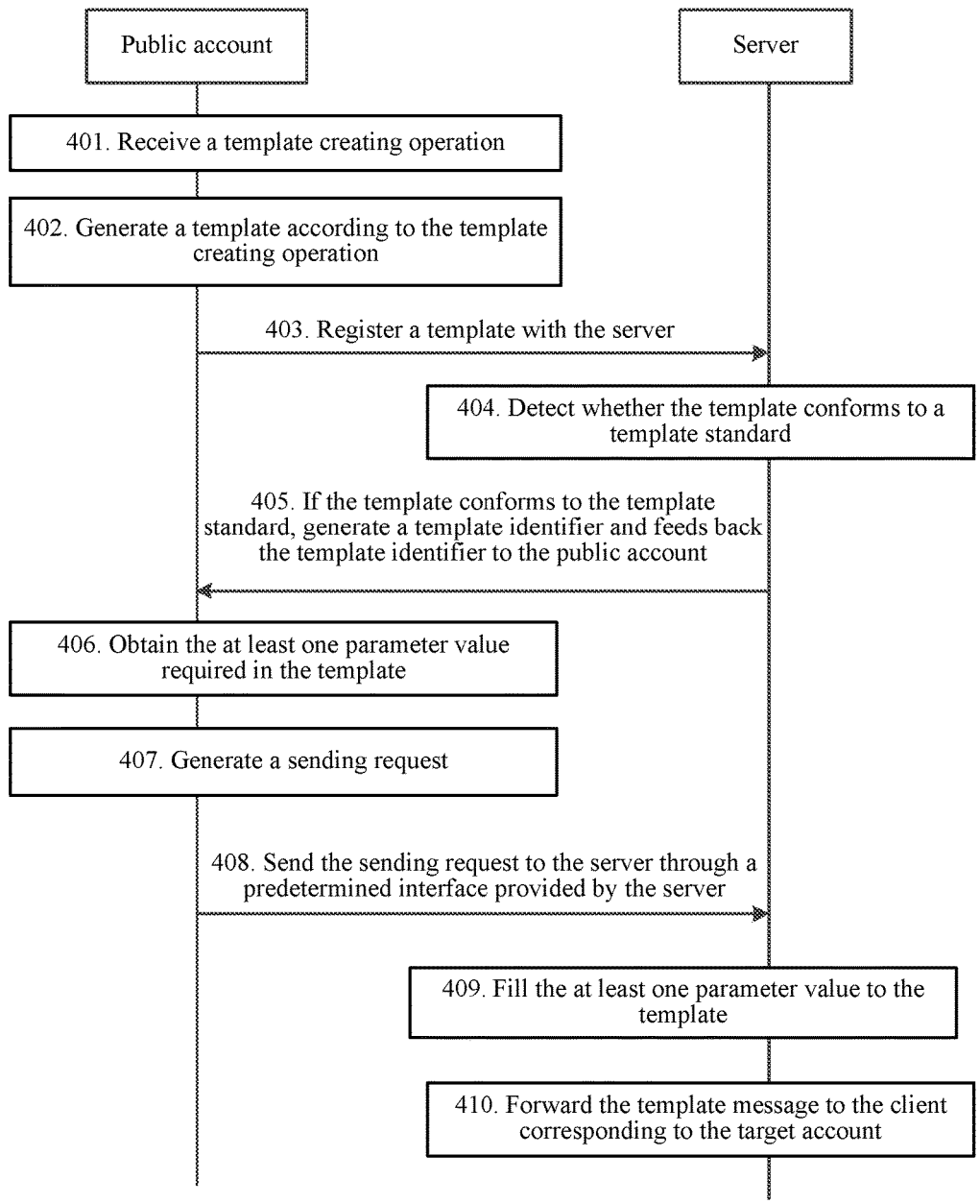
FIG. 4A is a flowchart of a message sending method in accordance with some embodiments.

In accordance with some embodiments, FIG. 4A is a flowchart of a message forwarding method. In some embodiments, the method is applied to the implementation environment shown exemplified in FIG. 1. The method includes the following steps.

In accordance with some embodiments, in Step 401, a public account receives a template creating operation from a user.

In accordance with some embodiments, the public account needs to register a template used by the public account with a server in advance. At first, the public account receives the template creating operation from a user.

In accordance with some embodiments, in Step 402, the public account generates a template according to the template creating operation, wherein the template includes static content and at least one parameter value.

A template of "goods shopping notification" is used as an example and the template is as follows.

```
goods {{Goods.DATA}}
unit price {{Unit_price.DATA}}
quantity {{Quantity.DATA}}
total {{Total.DATA}}
source shop {{Source.Shop.DATA}}
recommendation class {{Source.Recommend.DATA}}.
```

All these "goods", "unit price", "quantity", "total", "source shop" and "recommendation class" are static content; and "Goods", "Unit_price", "Quantity", "Total", "Source.Shop" and "Source.Recommend" are parameters.

It should be noted that in the foregoing template generating process, the suffix name of a parameter value has to conform to a predetermined suffix name ".DATA" or otherwise is regarded as a reserved word (a field which is useless temporarily and used for subsequent extension). Additionally, the parameter value may support structured data. For example, "Source.Shop" and "Source.Recommend" are two sub-parameter values belonging to the parameter "Source".

In accordance with some embodiments, in Step 403, the public account registers a template with the server.

Correspondingly, the server receives the registration of the public account for the template, and the template includes static content and the at least one parameter value.

In accordance with some embodiments, in Step 404, the server detects whether the template conforms to a template standard.

If the detection result is that the template being registered conforms to the template standard, continue to step 405; and if the detection result is that the template being registered does not conform to the template standard, send registration failure information to the public account.

In accordance with some embodiments, in Step 405, if the detection result is that the template conforms to the template standard, the server generates a template identifier of the template and feeds back the template identifier to the public account.

In accordance with some embodiments, the template identifier is used for a public account to invoke the template from the server to send the template message meanwhile the server associates the template with the template identifier and stores them.

In the steps 401 to 405, the public account completes the process of registering a template with the server. Subsequently, the public account may use the template to send the template message.

In accordance with some embodiments, in Step 406, the public account obtains the at least one parameter value required in the template.

When the public account needs to send a message to a client corresponding to the receiving account, the public account first obtains at least one parameter value. In some embodiments, the public account extracts the at least one parameter value from personal information data corresponding to the receiving account. The parameter value may include an event time, an event address, an event name, an event type, an event content, a link and a message parameter. In some embodiments, the user of the public account enters the parameter value.

In some embodiments, a parameter value supports structure value and includes at least two sub-parameter values. For example, a template of "goods shopping notification" is shown.

```
"data": {
    "Goods": "apple",
    "Unit_price": "RMB20.13",
    "Quantity": "5",
    "Total": "RMB100.65",
    "Source": {
        "Shop": "Fruit shop",
        "Recommend": "5 stars"
    }
}
```

Namely, the value of the parameter "Goods" is "apple", the value of the parameter "Unit_price" is "RMB20.13", the value of the parameter "Quantity" is "5", the value of the parameter "Total" is "RMB100.65", the value of the sub-parameter "Source.Shop" is "Fruit shop and the value of the sub-parameter "Source.Recommend" is "5 stars.

It should be noted that because that the value of the sub-parameter "Source.Shop" is "Fruit shop" and that the value of the sub-parameter "Source.Recommend" is "5 stars." These two sub-parameters may be merged together and placed in parameter brackets of "Source".

In accordance with some embodiments, in Step 407, the public account generates a sending request according to a template identifier, a receiving account and the at least one parameter value.

The sending request may be a POST request, which is a request of transferring data to the server. For example, using the "goods shopping notification" template, the sending request generated by the public account includes:

```
{
"touser": "OPENID",//to user refers to a receiving account.
"template_id": "ngqIpbwh8bUfc",//template_id refers to a template identifier
"topcolor": "#FF0000",//topcolor refers to the color of a title bar.
"data": {
    "Goods": "apple",
    "Unit_price": "RMB20.13",
    "Quantity": "5",
    "Total": "RMB100.65",
    "Source": {
    "Shop": "Fruit shop",
    "Recommend": "5 stars"
    }
}
}
```

In accordance with some embodiments, in Step 408, the public account sends the sending request to the server through a predetermined interface provided by the server.

Correspondingly, the server receives the sending request sent by the public account and the sending request carries a template identifier, a receiving account and the at least one parameter value.

In accordance with some embodiments, in Step 409, the server fills the at least one parameter value to the template to generate the template message.

The server first obtains the template according to the template identifier and then fills the at least one parameter value in a corresponding location in the template separately. If the current parameter value includes at least two sub-parameter values, the at least two sub-parameter values are separately filled in respective corresponding locations. Finally, the server generates the template message by using the filled parameter value and the static content in the template.

For example, the template message generated by the server for the "goods shopping notification" is as follows.

goods: apple
unit price: RMB 20.13
quantity: 5
total: RMB 100.65
source shop: Fruit shop
recommendation class: 5 stars In accordance with some embodiments, in Step 410, the server forwards the template message to the client device of the receiving account. After the server forwards the generated template message, the client device receives and displays the template message.

Figure 4B:
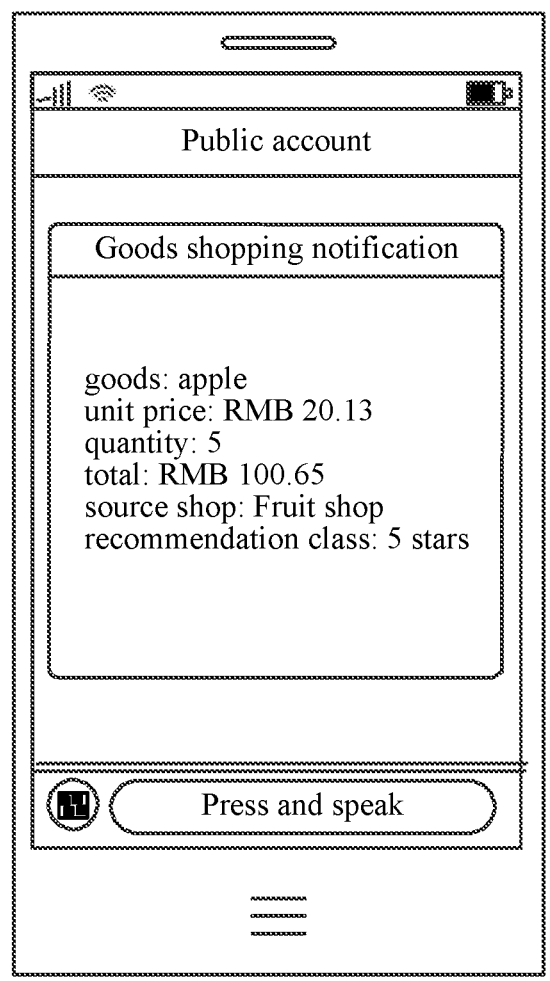
FIG. 4B is a schematic diagram of an implementation interface in accordance with some embodiments.

For example, the template message displayed by the client corresponding to the receiving account is shown in FIG. 4B.

In a specific example, a user follows the public account of bank A in a social communications application and then uses a credit card of bank A to purchase a commodity on an electronic commerce website. Then after the transaction is successful, bank A uses its own public account to send a template message of "payment notification" to the social communications application of the user. Transaction information of the user is recorded in the credit card swiping notification in detail, such as the order serial number, the commodity name, transaction completion time, the transaction amount and the seller information. Meanwhile, since Bank A is using the "payment notification" template, the sever does not block this message because it is a permitted template rather than a free-form message which could be an advertisement.

Figure 4C:
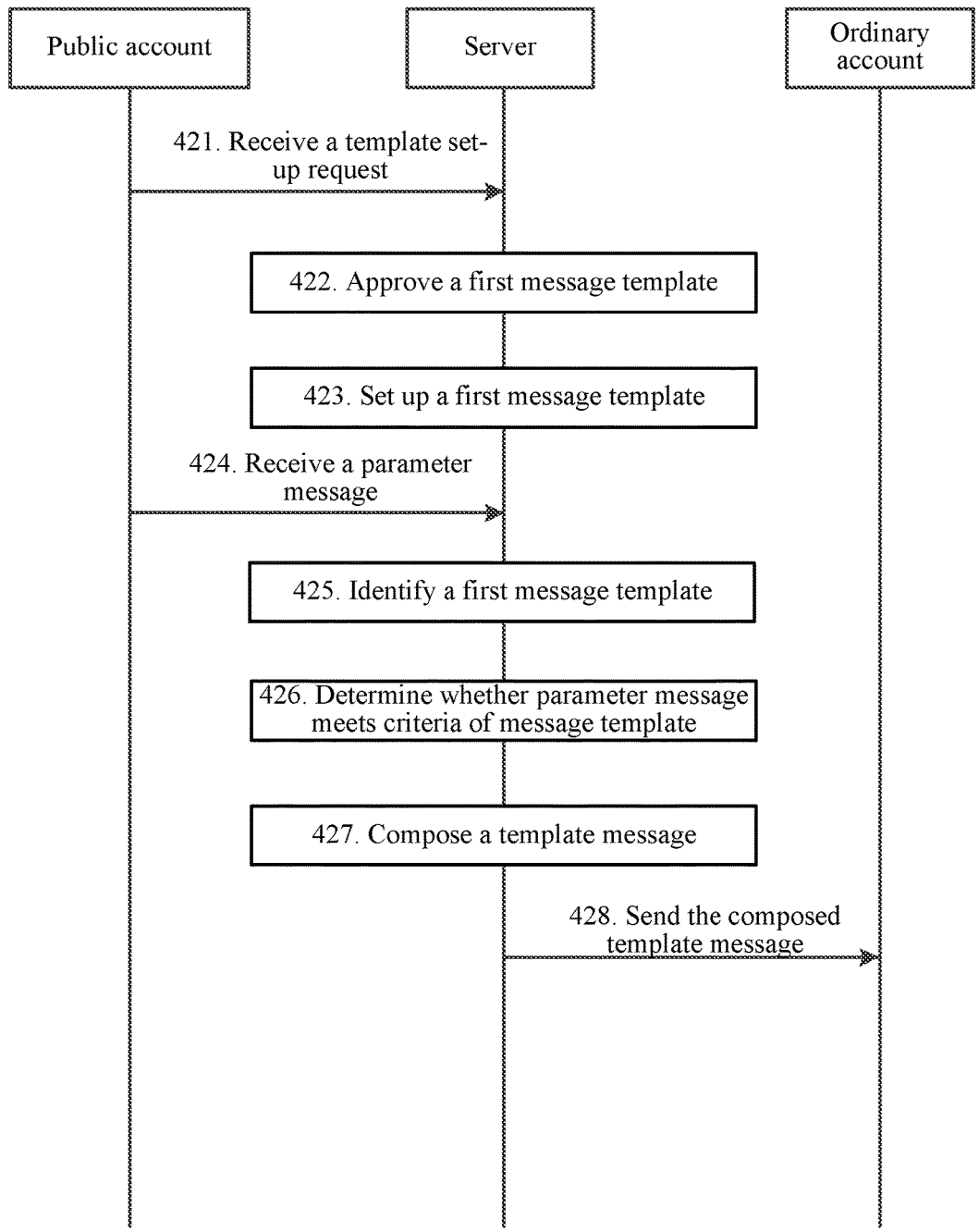
FIG. 4C is a flowchart of a method of processing messages on a social network in accordance with some embodiments.

FIG. 4C is a flowchart of a public account sending template messages to social network followers in accordance with some embodiments. The method is performed at a server having one or more processors and memory for storing one or more programs to be executed by the one or more processors. In accordance with some embodiments, the server is a server of a social network platform. The server receives social network messages from one social network account and forwards messages to other social network accounts.

In accordance with some embodiments, in a step 421, the server receives template set-up request from the first social network account, the template set-up request including the first message template, and the first message template including at least one parameter to be filled with a message-specific value.

In some embodiments, a template includes a plurality of parameters, useful for creating repetitively occurred messages. In some embodiments, a template consists of some fixed expressions or static content that are associated with parameters. For example, a public account provides weather service and one of its templates is a weather template. The template includes: "on (date parameter) the temperature is (temperature parameter) in (location parameter)." Once the date, temperature and location parameters are filled with values, the template message reads, e.g.: "On June 4, the temperature is between 91 degree and 74 degree in Washington, D.C." The template should also include variables that can be automatically filled out by the server, e.g., the recipient's name, current date, etc. A template message could be a sales receipt, reservation confirmation, weather service, traffic service, flight schedule information, product promotion, advertisement, automatic reply, customer guidance, facility introduction, news headlines, transaction confirmation, delivery notice, etc.

In accordance with some embodiments, in a step 422, the server approves the first message template in accordance with one or more predetermined template rules. In some embodiments, the one or more predetermined template rules include whether the template conforms to certain standard, e.g., whether the template is offensive, advertisement, containing useful/relevant information to potential recipients, or consistent with characteristics of the public account. In some embodiments, the template rules further include template format, template parameter value quantity, total template length, contents not allowed to occur in a template, and so on.

For example, a public account is registered as an online news resource in the server, and it requests to use a template of a goods sales receipt. The server rejects its request because the template of sales receipt is not compatible with the registered characteristic of the public account.

In some embodiments, approving the first message template in accordance with one or more predetermined template rules includes having a person review the template to make sure it conforms to certain standards. For example, a manager may review the received templates and instruct the server to approve or reject the templates.

In accordance with some embodiments, in a step 423, the server sets up the first message template in accordance with the template set-up request.

In some embodiments, the message templates are stored in a template database of the server. In some embodiments, the templates can only be used by the accounts setting them up, or accounts approved the by the accounts setting them up.

In accordance with some embodiments, some accounts choose to use existing templates stored in the server. These accounts may send a request of using a plurality of templates. The server then determines whether to approve the quest based on various criteria. These criteria may include whether the creator of a template makes the template available to others, whether the purpose of the template is compatible with the nature of the user, etc.

In accordance with some embodiments, when a user wants to send a template message, his account sends a parameter message to the server. In this application, the account sending the parameter message to the server is called a sending account. In accordance with some embodiments, in a step 424, the server receives a parameter message from a first social network account, the parameter message specifying a template identifier for a first message template, and a respective value of at least one parameter of the first message template. In some embodiments, the parameter message is a sending request as described in FIG. 2 and accompanying text.

For example, a parameter message for a hotel reservation reads: "Reservation, June 12, James Smith, King-size, non-smoking, till 8 pm." "Reservation" is the template identifier and other words are values of parameters of date, name, size of bed, smoking room or not, latest check-in time. In some embodiments, the order of words indicates the corresponding relationships among values and parameters. For example, for parameter message invoking a particular template, the words before the first comma are always the template identifier, the words between the first comma and the second comma are always a value for a first parameter, the words between the second comma and the third comma are always a value for a second parameter, and so on. In some embodiments, the parameter message uses words or acronyms to indicate the parameters that the values belong to. For example, the parameter message may read: "Reservation, date June 12, name James Smith, bed King-size, type non-smoking, check-in till 8 pm." In some embodiments, the server intelligently assigns values to parameters. For example, the server recognizes non-smoking as a type of a room, and June 12 as a date because that is what these words usually mean.

In some embodiments, the sending account has only registered one template with the server, and the parameter message does not need to state the template identifier in the parameter message. In essence, the sending account information within the parameter message specifies the template identifier. In some embodiments, the value of a parameter specifies the template identifier since the server recognizes the value or the parameter as belonging to a template. The template identifier is implied in the at least one parameter. For example, a message including a parameter "temperature" is automatically recognized as using the "weather" template. The message does not need to explicitly include the "weather" template identifier. In some embodiments, recognizing templates from parameters or values includes acquiring a list of templates that the sending account has set up, subscribed or registered, and then identifying a template from the list.

In accordance with some embodiments, the parameter message further specifies the at least second social network account as a recipient for the template message. In this application, a recipient of the template message is called a receiving account. In some embodiments, the first social network account is a public account, and the second social network account is a follower account of the public account. When the first account sends a message to all follower accounts, the first account does not need to specify the receiving accounts. In some embodiments, when only a subset of the followers are to be the recipient, the public account needs to specify the receiving accounts, e.g., by identifying which subset of followers should receive the message.

In some embodiments, before receiving the parameter message from the first social network account, the server sends a template interface to the first social network account, the template interface is configured to receive input specifying parameters in the message template. For example, the sending account may request to send a template message. In response to the template message, the server sends a template interface into which a user can input values for parameters. A template interface could be webpage that includes a table, in which parameter values are to be entered into predetermined cells. In some embodiments, the template interface also includes a template identifier.

In accordance with some embodiments, in a step 425, in accordance with the template identifier specified in the parameter message, the server identifies the first message template from a plurality of stored message templates.

In accordance with some embodiments, identifying the first message template from the plurality of stored message templates includes identifying the templates that the sending account has set up, subscribed or registered. For example, the parameter message includes a template identifier "transaction confirmation." However, there might be tens of thousands of accounts that created "transaction confirmation" templates. Instead of randomly choosing from the tens of thousands of "transaction confirmation" templates, the server uses the "transaction confirmation" template that the sending account has registered with the server.

In accordance with some embodiments, identifying the first message template from the plurality of stored message templates includes searching the template identifier from all available templates. The sending account is permitted to use templates beyond the templates that the account has previously set up, subscribed, registered or used. In some embodiments, the server recommends related templates to the sending account or opens a template database in which the sending account can search created templates.

In accordance with some embodiments, in a step 426, the server determines whether the parameter message meets predetermined criteria of the identified first message template. In some embodiments, the predetermined criteria of the identified first message template include a total number of messages received from the first social network account within a predetermined period of time, the number of messages sent using this template, the time of the day sending this template message, relationships between the sending accounts and the receiving accounts, whether the second account sending a message to the first account within ten minutes before, whether the second account sending a message in a particular template to the first account, whether the templates are permitted by the receiving account, etc.

For example, the server may allow a sending account to use Template A under all circumstances, Template B only under certain predetermined circumstances and never to use Template C. For example, the server may allow a merchant account to send up to two advertisement template messages every week to each receiving account. The predetermined criteria of the identified message template include having sent no more than two advertisement template messages this week to the identified receiving accounts.

For another example, the template messages are counted separately from non-template messages from the public account. A public account is allowed to send one free-form message, but three template messages to its followers each day. The server performs the following actions: (1) receiving a message request (this can be a regular free-form message or a parameter message); (2) determining whether the message request is a free-form message or a parameter message based on its format; (3) if the message request is a free-form message, determining whether the free-form message meets predetermined criteria for free-form messages (e.g., no more than one per day); (4) if the message request is a parameter template message, determining whether the specified template identifier exists and has been approved, and if so, whether the parameter message meets the predetermined criterion for template messages (e.g., no more than three per day); (5) If the free-form message meets criterion, send the free-form message to the followers; or if the parameter message meets the predetermined criteria for template messages, composing a template message, and sending the composed template message to the receiving account.

For yet another example, the server allows Account A to send an "event invitation" template message to Account B only when Account B is a follower of Account A and has sent at least one message to Account A within the last 30 days.

In accordance with some embodiments, approving the first message template in accordance with one or more predetermined template rules comprises: approving the first message template for the at least second social network account in accordance with a determination that the first message template matches a format of a reply message previously sent from the first social network account to the at least second social network account in response to an inquiry message from the at least second social network account.

For example, a user A sends an inquiry message "what's the weather in Palo Alto?" to a weather service public account. The weather server replies with a reply message "The weather in Palo Alto today is: Sunny, 85 degrees." If the template is of the same format "The weather in Palo Alto is: . . . , . . . " then the template is approved by the server and stored as an approved template for the user A.

In accordance with some embodiments, in a step 427, in accordance with the identified first message template and the value of the at least one parameter, the server composes a template message.

In accordance with some embodiments, in accordance with the identified first message template and the value of the at least one parameter, composing the template message comprises: filling the value of the at least one parameter into the identified first message template. For example, the server identifies a weather template, which includes: "on (date parameter) the temperature is (temperature parameter) in (location parameter)." The server then fills the date, temperature and location parameters with values from a parameter message, the template message reads, e.g.: "On June 4, the temperature is between 91 degree and 74 degree in Washington, D.C."

In some embodiments, composes a template message includes adding static portions of the template into the message. Static portions of a template are content that is included in the template and not acquired from the content of the parameter message. For example, the template includes static text (e.g., description of a parameter, saluting sentences), background tables, logos, etc. A weather service template includes static text such as "thanking for using our service. For any suggestions, please call 123-4567." A sale receipt template message includes a hyperlink leading to a merchandise display website.

In accordance with some embodiments, in a step 428, the server sends the composed template message to at least a second social network account as a message originated from the first social network account. In some embodiments, when the second social network account receives a template message, the message shows that it is sent from the sending account rather than composed by the server.

Figure 4D:
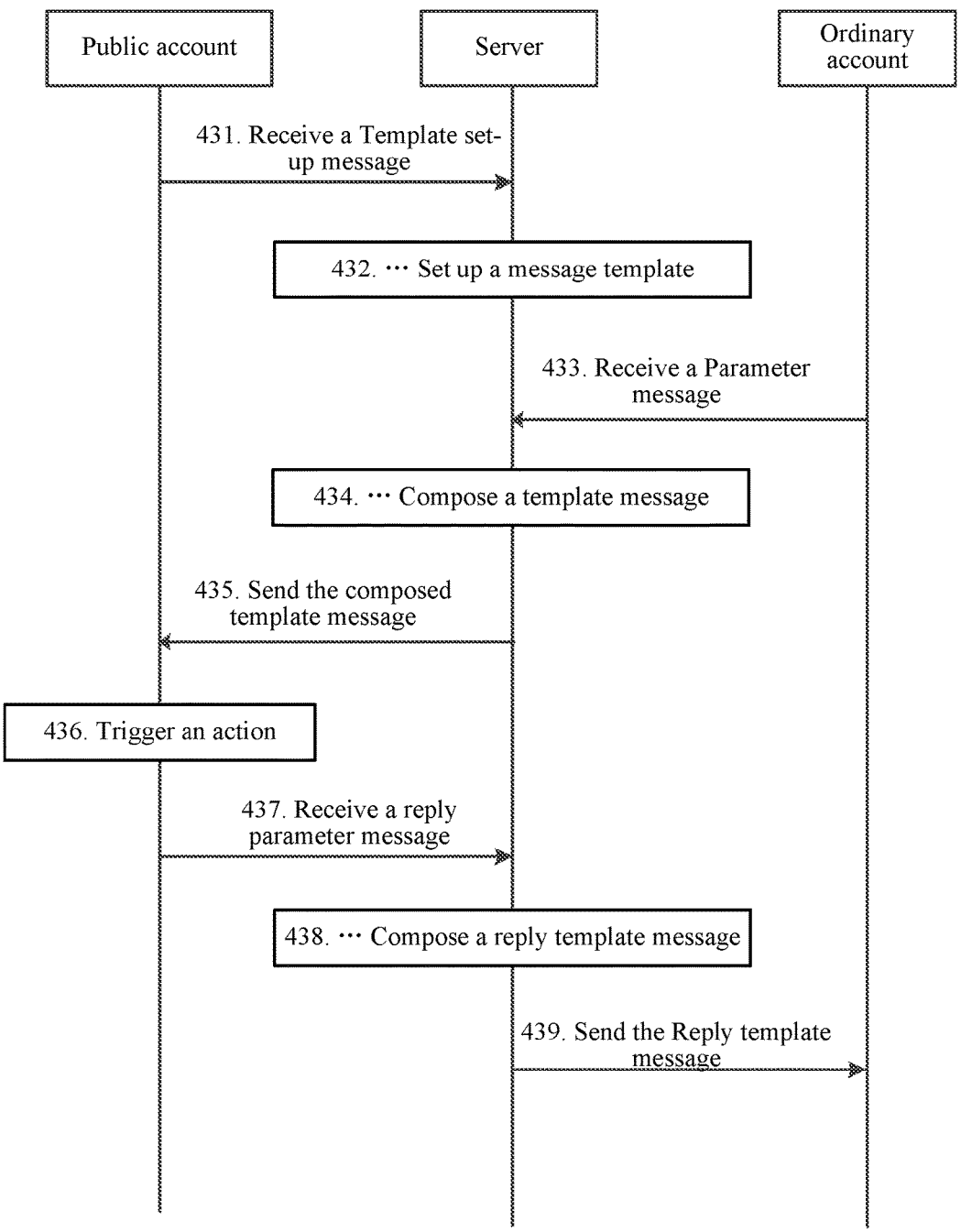
FIG. 4D is a flowchart of a method of processing messages on a social network in accordance with some embodiments.

FIG. 4D is a flowchart of an ordinary account sending template messages to a public account in accordance with some embodiments.

In accordance with some embodiments, in steps 431 and 432, a public account sets up templates which are used for sending template messages to itself. The process of setting up a template by a receiving account can be substantially identical with the process of setting up a template by a sending account. In addition, an ordinary account can also use templates that are stored in the server and approved by the public account. For example, a mail delivery company sets up a public account being managed by computers. The public account receives hundreds of inquiry messages every day from its customers regarding the status of deliveries. The delivery company sets up a plurality of inquiry templates for customers to use. Receiving template messages enables the computers managing the account to obtain inquiry information (such as mail order number) accurately and automatically. Meanwhile, the customers benefit from composing a shorter message and getting instant reply.

In accordance with some embodiments, in a step 433, the server receives a parameter message from a first social network account, the parameter message specifying a template identifier for a first message template, and a respective value of at least one parameter of the first message template. In some embodiments, the parameter message specifies that the receiving account is the public account.

In accordance with some embodiments, identifying the first message template from the plurality of stored message templates includes identifying the templates that are associated with the receiving account. In some embodiments, the receiving account has registered a plurality of templates and makes an arrangement with the server that only messages with the registered plurality of templates will be forwarded to the receiving accounts.

For example, a follower of a traffic service account sends a parameter message "Traffic, Michigan Ave, Chicago, South to North." The parameter message specifies a traffic inquiry template and provides values for parameters road, city and direction.

In accordance with some embodiments, in a step 434, the server composes a template message as in the steps 425-427.

In accordance with some embodiments, in a step 435, the server sends the composed template message to the public social network account as a message originated from the ordinary account.

In accordance with some embodiments, the template message is configured to trigger an action of the second social network account. Therefore, in some embodiments, in a step 436, the template message triggers an action of the public account.

In accordance with some embodiments, the user of the public account configures the public account to perform an automatic action once a social network message meeting predetermined criteria. For example, a traffic service account automatically replies a traffic information template message in accordance with the received traffic inquiry template message. For another example, the incoming message from a customer is a template message for reserving a hotel room, the automatic action includes making a reservation based on the information in the incoming message, receiving the reservation result, and sending a reply parameter message including the reservation result.

In accordance with some embodiments, in a step 437, the server receives a reply parameter message. In accordance with some embodiments, in steps 438 to 439, the server composes and sends a reply template message to the ordinary account.

In some embodiments, determining whether parameter message meets criteria of message template, the criteria of a first message template include whether receiving a second message template within a predetermined period of time before. For example, the predetermined criteria of Template A include the receiving account having sent a Template B message to the sending account. For example, Template A is a sales receipt template while Template B is a purchase template. The sales receipt template is permitted only after the purchase template message has been sent to the sending device.

Figure 5:
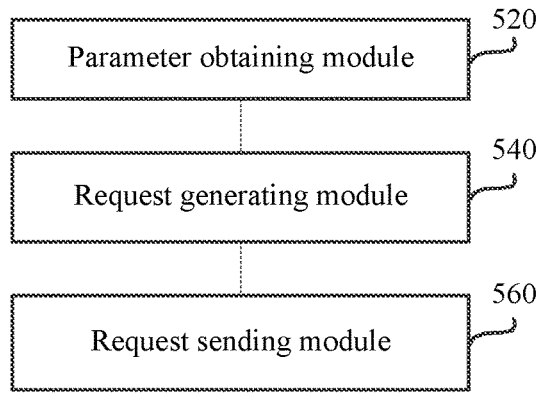
FIG. 5 is a structural block diagram of a message sending apparatus in accordance with some embodiments.

In accordance with some embodiments, FIG. 5 is a structural block diagram of a message sending apparatus. The message sending apparatus may be implemented as all or a part of a public account client device through software, hardware or a combination thereof. The apparatus includes a parameter obtaining module 520, a request generating module 540 and a request sending module 560.

In some embodiments, the parameter obtaining module 520 is used for obtaining at least one parameter value.

The request generating module 540 is used for generating a sending request according to a template identifier, a receiving account and the at least one parameter value.

The request sending module 560 is used for sending the sending request to a server through a predetermined interface provided by the server.

Figure 6:
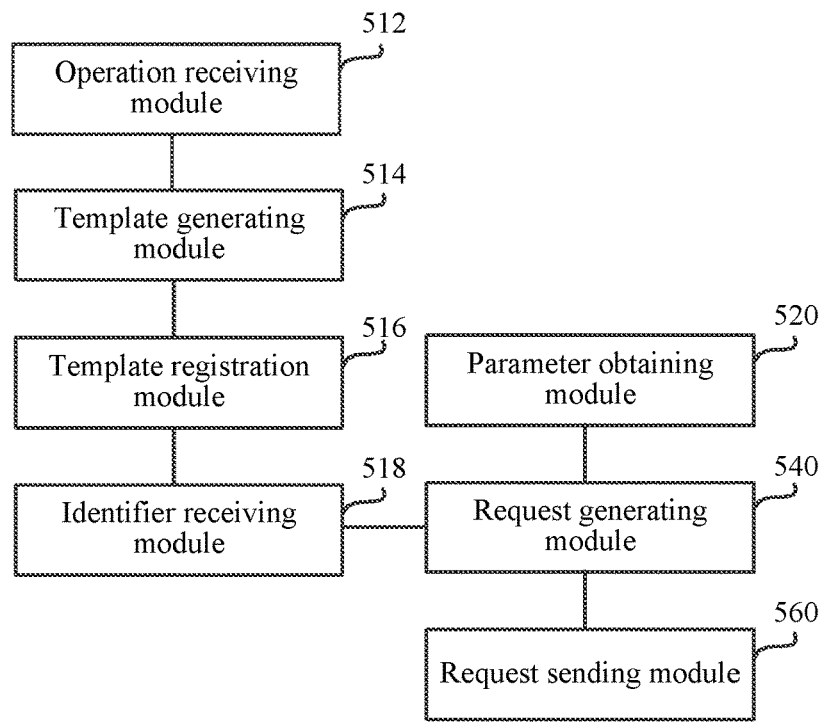
FIG. 6 is a structural block diagram of a message sending apparatus in accordance with some embodiments.

In accordance with some embodiments, FIG. 6 is a structural block diagram of a message sending apparatus. The apparatus includes an operation receiving module 512, a template generating module 514, a template registration module 516, an identifier receiving module 518, a parameter obtaining module 520, a request generating module 540 and a request sending module 560.

The operation receiving module 512 is used for receiving a template creating operation.

The template generating module 514 is used for generating the template according to the template creating operation. The template registration module 516 is used for registering the template with the server. The identifier receiving module 518 is used for receiving the template identifier from the server.

The parameter obtaining module 520 is used for obtaining the at least one parameter value required in the template.

The request generating module 540 is used for generating a sending request according to a template identifier, a receiving account and the at least one parameter value.

The request sending module 560 is used for sending the sending request to a server through a predetermined interface provided by the server.

The parameter obtaining module 520 is used for extracting the at least one parameter value from personal information data of the receiving account, wherein the parameter value includes at least one of an event time, an event address, an event name, an event type, an event content, a link and a message parameter.

The parameter obtaining module 520 is used for extracting at least two sub-parameter values required in the parameter value from the personal information data of the receiving account.

Figure 7:
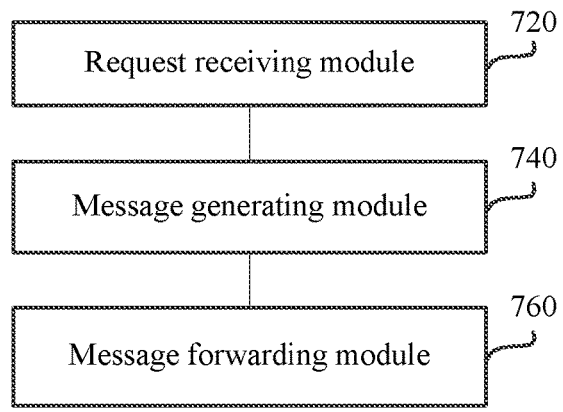
FIG. 7 is a structural block diagram of a message forwarding apparatus in accordance with some embodiments.

In accordance with some embodiments, FIG. 7 is a structural block diagram of a message forwarding apparatus. The message forwarding apparatus may be implemented as all or a part of a server through software, hardware or a combination thereof. The apparatus includes a request receiving module 720, a message generating module 740 and a message forwarding module 760.

The request receiving module 720 is used for receiving a sending request sent by a public account client. The message generating module 740 is used for filling the at least one parameter value to a template to generate a template message. The message forwarding module 760 is used for forwarding the template message to a client corresponding to the receiving account.

Figure 8:
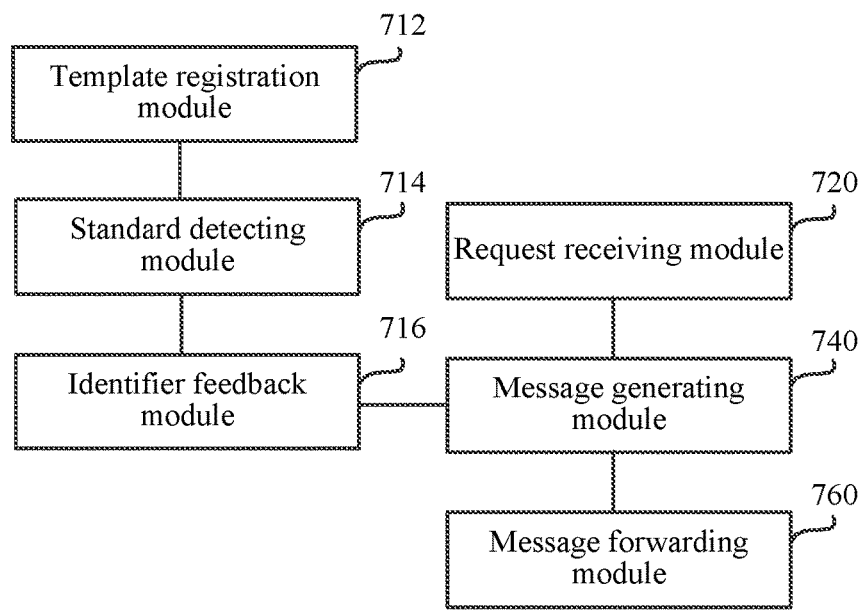
FIG. 8 is a structural block diagram of a message forwarding apparatus in accordance with some embodiments.

In accordance with some embodiments, FIG. 8 is a structural block diagram of a message forwarding apparatus. The message forwarding apparatus may be implemented as all or a part of a server through software, hardware or a combination thereof and the apparatus includes a template registration module 712, a standard detecting module 714, an identifier feedback module 716, a request receiving module 720, a message generating module 740 and a message forwarding module 760.

The template registration module 712 is used for receiving the registration of the public account client for the template, wherein the template includes static content and at least one parameter value.

The standard detecting module 714 is used for detecting whether the template conforms to a template standard.

The identifier feedback module 716 is used for generating a template identifier of the template and feeding back the template identifier to the public account client.

The request receiving module 720 is used for receiving a sending request sent by a public account client, wherein the sending request carries a template identifier, a receiving account and the at least one parameter value.

The message generating module 740 is used for filling the at least one parameter value in a template corresponding to the template identifier to generate a template message.

The message forwarding module 760 is used for forwarding the template message to a client corresponding to the receiving account.

The message generating module 740 includes a parameter filling unit and a message generating unit (not shown in the drawing).

The parameter filling unit is used for filling the parameter value in a corresponding location in the template separately.

The message generating unit is used for generating the template message by using the filled parameter value and the static content in the template.

The parameter filling unit is used for filling the at least two sub-parameter values are separately in respective corresponding locations.

In the message forwarding apparatus provided in some embodiments, a parameter value supporting structured data is further provided, so that expression manners of parameter values in a template message are more abundant.

Figure 9:
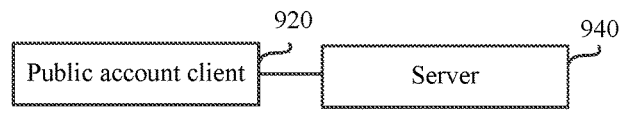
FIG. 9 is a structural block diagram of a message sending system in accordance with some embodiments.

In accordance with some embodiments, FIG. 9 is a structural block diagram of a message sending system. The message sending system includes a public account client 920 and a server 940, and the public account client 920 and the server 940 are connected through a wireless network or wired network.

The public account client 920 includes the message sending apparatus provided in the embodiment shown in FIG. 5 or FIG. 6.

The server 940 includes the message forwarding apparatus provided in the embodiments shown in FIG. 7 or FIG. 8.

Figure 10:
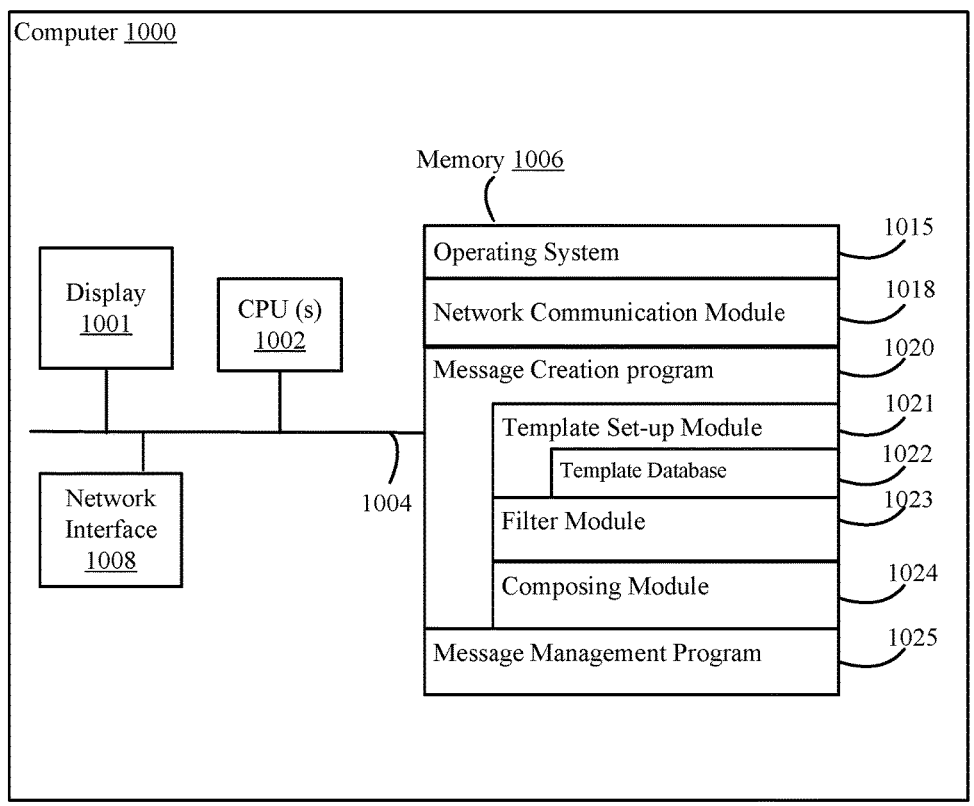
FIG. 10 is a diagram of an example implementation of a server in accordance with some embodiments.

FIG. 10 is a diagram of an example implementation of a server 1000 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the server 1000 includes one or more processing units (CPU's) 1002, one or more network or other communications interfaces 1008, a display 1001, memory 1006, and one or more communication buses 1004 for interconnecting these and various other components. The communication buses may include circuitry (sometimes called a chipset) that interconnects and controls communications between system components. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 may optionally include one or more storage devices remotely located from the CPU(s) 1002. The memory 1006, including the non-volatile and volatile memory device(s) within the memory 1006, comprises a non-transitory computer readable storage medium.

In some implementations, the memory 1006 or the non-transitory computer readable storage medium of the memory 1006 stores the following programs, modules and data structures, or a subset thereof including an operating system 1016, a network communication module 1018, a message creation program 1020 and a message management program 1025.

In accordance with some embodiments, the operating system 1016 includes procedures for handling various basic system services and for performing hardware dependent tasks.

In accordance with some embodiments, the network communication module 1018 facilitates communication with other devices via the one or more communication network interfaces 1008 (wired or wireless) and one or more communication networks, such as the internet, other wide area networks, local area networks, metropolitan area networks, and so on.

In accordance with some embodiments, the message creation program 1020 is configured to create template messages in accordance with receive parameter messages. In some embodiments, the message creation program 1020 comprises a template set-up module 1021, a filter module 1023 and a composing module 1024. The template set-up module 1021 provides template set-up interfaces, receiving template set-up requests, sets up templates and stores templates. The template set-up module 1021 comprises a template database 1022. The template database 1022 stores templates for accounts. In some embodiments, the template database 1022 is included in a user account database. The filter module 1023 determines whether the parameter message meets predetermined criteria of the identified message template and rejects parameter messages which do not meet the criteria. The composing module 1024 composes template messages in accordance with valid parameter messages.

In accordance with some embodiments, the message management program 1025 manages social network messaging among accounts, including receiving and forwarding social network messages. The message management program 1025 further receives parameter messages and sends template messages composed by the message creation program 1020.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present technology to the precise forms disclosed. Many modifications and variations are possible. In view of the above teachings. The embodiments were chosen and described in order to best explain the principles of the present technology and its practical applications, to thereby enable others skilled in the art to best utilize the present technology and various embodiments with various modifications as are suited to the particular use contemplated.

What is claimed is:

1. A method of processing messages on a social network, comprising:

at a server having one or more processors and memory for storing one or more programs to be executed by the one or more processors:

receiving a parameter message from a first social network account, the parameter message specifying information that identifies a first message template, a respective value of at least a first parameter of the first message template, and at least a second social network account;

determining whether the parameter message meets predefined criteria of the identified first message template, wherein the predefined criteria of the identified first message template includes a predefined criterion on a social network relationship between the first social network account and the second social network account and the predefined criteria of the identified first message template include a criterion limiting a total number of template messages that are sent from the first social network account using the first message template;

in accordance with a determination that the parameter message meets the predefined criteria of the identified first message template, composing a template message in accordance with the first message template and the respective value of the first parameter; and sending the composed template message to at least the second social network account as a message originated from the first social network account.

2. The method of claim 1, wherein the first social network account is a public account, and the second social network account is a user account, and the criterion on the social network relationship between the first social network account and the second social network account require that the user account is a follower's account for the public account.

3. The method of claim 1, wherein the information that identifies the first message template is a parameter value that is distinct from a template identifier of the first message template, and the server identifies the first message template from a plurality of message templates that are associated with the first social network account based on the parameter value.

4. The method of claim 1, wherein the first message template includes two or more parameters, and the server automatically supplies a respective parameter value for at least one of the two or more parameters when composing the template message.

5. The method of claim 1, wherein the predefined criteria of the identified first message template include a criterion limiting a total number of messages that are sent from the first social network account within a predetermined period of time.

6. The method of claim 1, including:

at the server having one or more processors and memory for storing one or more programs to be executed by the one or more processors:

receiving a free-form message from the first social network account;

determining whether the free-form message meets predefined free-form message criteria for the first social network account, wherein the predefined free-form message criteria for the first social network account are distinct from the predefined criteria of the identified first message template; and in accordance with a determination that the free-form message does not meet the predefined free-form message criteria for the first social network account, blocking the free-form message from the first social network account.

7. A server for processing messages on a social network, comprising:

one or more processors; and memory storing one or more programs for execution by the one or more processors, the one or more programs including instructions, which when executed by the one or more processors, cause the processors to perform operations comprising:

receiving a parameter message from a first social network account, the parameter message specifying information that identifies a first message template, a respective value of at least a first parameter of the first message template, and at least a second social network account;

determining whether the parameter message meets predefined criteria of the identified first message template, wherein the predefined criteria of the identified first message template includes a predefined criterion on a social network relationship between the first social network account and the second social network account and the predefined criteria of the identified first message template include a criterion limiting a total number of template messages that are sent from the first social network account using the first message template;

in accordance with a determination that the parameter message meets the predefined criteria of the identified first message template, composing a template message in accordance with the first message template and the respective value of the first parameter; and sending the composed template message to at least the second social network account as a message originated from the first social network account.

8. The server of claim 7, wherein the first social network account is a public account, and the second social network account is a user account, and the criterion on the social network relationship between the first social network account and the second social network account require that the user account is a follower's account for the public account.

9. The server of claim 7, wherein the information that identifies the first message template is a parameter value that is distinct from a template identifier of the first message template, and the server identifies the first message template from a plurality of message templates that are associated with the first social network account based on the parameter value.

10. The server of claim 7, wherein the first message template includes two or more parameters, and the server automatically supplies a respective parameter value for at least one of the two or more parameters when composing the template message.

11. The server of claim 7, wherein the predefined criteria of the identified first message template include a criterion limiting a total number of messages that are sent from the first social network account within a predetermined period of time.

12. The server of claim 7, wherein the operations further include:

receiving a free-form message from the first social network account;

determining whether the free-form message meets predefined free-form message criteria for the first social network account, wherein the predefined free-form message criteria for the first social network account are distinct from the predefined criteria of the identified first message template; and in accordance with a determination that the free-form message does not meet the predefined free-form message criteria for the first social network account, blocking the free-form message from the first social network account.

13. A non-transitory computer readable storage medium having instructions stored thereon, the instructions, when executed by one or more processors, cause the processors to perform operations comprising:

receiving a parameter message from a first social network account, the parameter message specifying information that identifies a first message template, a respective value of at least a first parameter of the first message template, and at least a second social network account;

determining whether the parameter message meets predefined criteria of the identified first message template, wherein the predefined criteria of the identified first message template includes a predefined criterion on a social network relationship between the first social network account and the second social network account and the predefined criteria of the identified first message template include a criterion limiting a total number of template messages that are sent from the first social network account using the first message template;

in accordance with a determination that the parameter message meets the predefined criteria of the identified first message template, composing a template message in accordance with the first message template and the respective value of the first parameter; and sending the composed template message to at least the second social network account as a message originated from the first social network account.

14. The computer-readable storage medium of claim 13, wherein the first social network account is a public account, and the second social network account is a user account, and the criterion on the social network relationship between the first social network account and the second social network account require that the user account is a follower's account for the public account.

15. The computer-readable storage medium of claim 13, wherein the information that identifies the first message template is a parameter value that is distinct from a template identifier of the first message template, and the server identifies the first message template from a plurality of message templates that are associated with the first social network account based on the parameter value.

16. The computer-readable storage medium of claim 13, wherein the first message template includes two or more parameters, and the server automatically supplies a respective parameter value for at least one of the two or more parameters when composing the template message.

17. The computer-readable storage medium of claim 13, wherein the predefined criteria of the identified first message template include a criterion limiting a total number of messages that are sent from the first social network account within a predetermined period of time.

18. The computer-readable storage medium of claim 13, wherein the operations further include:

receiving a free-form message from the first social network account;

determining whether the free-form message meets predefined free-form message criteria for the first social network account, wherein the predefined free-form message criteria for the first social network account are distinct from the predefined criteria of the identified first message template; and in accordance with a determination that the free-form message does not meet the predefined free-form message criteria for the first social network account, blocking the free-form message from the first social network account.

\* \* \* \* \*